United States Patent [19]

Chun

[11] Patent Number: 4,559,627
[45] Date of Patent: Dec. 17, 1985

[54] FACE PUMPED RECTANGULAR SLAB LASER APPARATUS HAVING AN IMPROVED OPTICAL RESONATOR CAVITY

[75] Inventor: Myung K. Chun, Manlius, N.Y.

[73] Assignee: General Electric Company, Syracuse, N.Y.

[21] Appl. No.: 621,676

[22] Filed: Jun. 18, 1984

[51] Int. Cl.[4] .............................................. H01S 3/08
[52] U.S. Cl. ....................................... 372/92; 372/95; 372/99; 372/103; 372/106; 372/12; 372/27
[58] Field of Search ....................... 372/92, 95, 98, 99, 372/103, 106; 378/27, 10, 12

[56] References Cited

U.S. PATENT DOCUMENTS 3,633,126  1/1972  Martin et al. ........................ 372/106
4,214,216  7/1980  Jones, Jr. ................................ 372/92

OTHER PUBLICATIONS

Chun et al., "Resonant-Mode Analysis of Single-Mode Face Pumped Lasers"; Appl. Opt., vol. 16, No. 4, Apr. 1977, p. 1067.

Chun et al., "Laser Resonator: An Electroptically Q-Switched Porro Prism Device"; Appl. Opt., vol. 15, No. 8, Aug. 76, p. 1942.

*Primary Examiner*—William L. Sikes
*Assistant Examiner*—Léon Scott
*Attorney, Agent, or Firm*—Richard V. Lang; Carl W. Baker

[57] ABSTRACT

The invention deals with a face pumped slab laser in which the slab is of a rectangular configuration, favoring use of an optical resonator cavity capable of producing a rectangular beam of good quality within the cavity. The novel optical resonator cavity, which produces this rectangular beam, is stable on one axis corresponding to the smaller beam dimension and unstable on an axis orthogonal to the first axis corresponding to the larger beam dimension. The result is both high efficiency, excellent power and a good quality output beam is produced.

13 Claims, 6 Drawing Figures

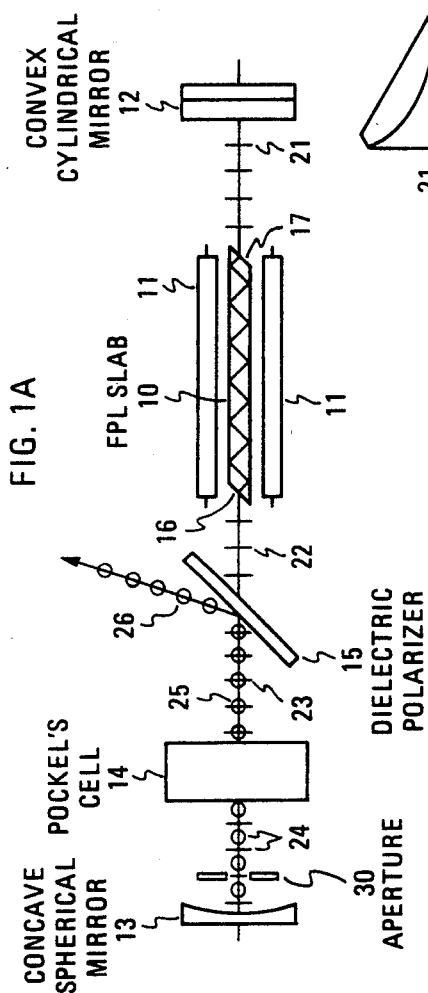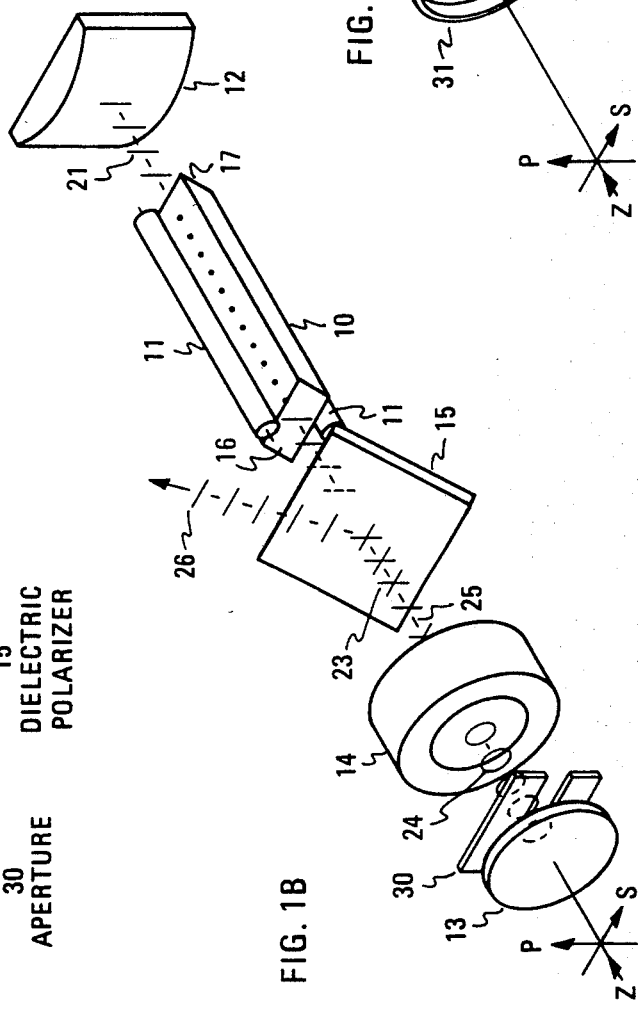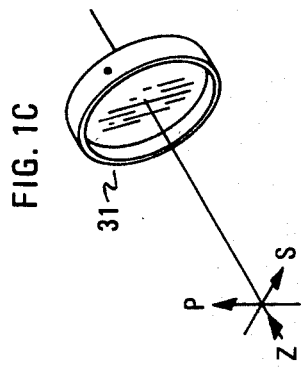

FACE PUMPED RECTANGULAR SLAB LASER APPARATUS HAVING AN IMPROVED OPTICAL RESONATOR CAVITY

BACKGROUND OF THE INVENTION

1. Field of the Invention

The invention relates to a laser apparatus in which the lasing medium is a slab of rectangular cross section and to a laser apparatus in which the optical cavity is optimized for use with a rectangular slab.

2. Description of the Prior Art

Lasers employing a rectangular slab as the active medium conventionally are face pumped, with the pumping source being provided by a flash lamp having an appropriate spectrum, placed adjacent two lateral faces. In the conventional face pumped laser, the laser is installed in an optical cavity with the end faces of the slab providing the entrant surfaces for the laser beam. Conventionally, the laser slab is cut in a parallelogram or trapezoid configuration, as seen from the side, with the angles of the faces being cut at the Brewster angle for full acceptance of light of a "P" polarization with a minimum loss. The beam is introduced on the axis of the slab with the entrant beam being diffracted to the bottom lateral surface, reflected to an upper lateral surface and so forth until it emerges at the other end face, normally in an extension of the same line and coincident with it.

The output power of the face pumped slab laser is limited by the bulk of the laser slab and its heat dissipating properties. In the interest of increasing the output power, the bulk of the laser laser slab may be increased. However, if a square cross section is retained, heat dissipation performance worsens as the thickness of the material through which heat must pass is increased. On the other hand, a rectangular cross section in which the bulk of the slab is increased without increasing the thickness through which heat must pass, improves the heat dissipation performance. In principal, the width dimensions could be significantly increased and additional flash lamps and additional cooling applied to the major lateral faces of the slab to produce proportional increases in the output beam. Having selected a slab of rectangular cross section, one must provide efficient coupling between the optical resonator and the laser slab and at the same time maintain good output beam quality.

SUMMARY OF THE INVENTION

Accordingly, it is an object of the present invention to provide a face pumped slab laser apparatus having an improved power output.

It is another object of the invention to provide a face pumped slab laser apparatus having improved output efficiency.

It is still another object of the invention to provide a face pumped slab laser apparatus using a rectangular slab having an improved optical resonator.

It is a further object of the invention to provide a face pumped slab laser apparatus using a rectangular slab having an optical resonator providing higher performance and improved beam quality.

These and other objects of the invention are achieved in a novel laser apparatus comprising a slab of a gain medium of rectangular cross section, optical pumping means, and a novel resonant optical cavity. A plane parallel to the larger lateral face of the slab passing through the optical axis defines an "S" plane of the apparatus, and a plane parallel to the smaller lateral face of the slab and passing through to optical axis defines a "P" plane of the apparatus. The optical pumping means may be coupled to the larger lateral surface of the slab to energize the beam.

The novel resonant optical cavity comprises a first convex cylindrical mirror having a finite radius of curvature ($R_1$) in the "S" plane, and a second concave spherical mirror spaced a distance L from the first mirror and having a radius of curvature $R_2$.

The variables $R_1$, $R_2$ and L are selected to effect stable resonator beam formation in the dimension of the beam lying in the "P" plane, and unstable resonator beam formation in the dimension of the beam lying in the "S" plane. The design is optimized to provide sufficient gain for lasing and an increased effective active energy extraction volume in the slab for maximum energy extraction.

The apparatus further comprises an aperture placed between the second mirror and the slab, the edges being oriented in planes parallel to the S plane to improve the beam quality to beam elements lying in the P plane.

In a preferred embodiment, the aperture provides a Fresnel number of greater than 1 and less than 4 to beam elements lying in the P plane, and the apparatus (i.e. the slab) provides a Fresnel number in excess of 10 to beam elements lying in the P plane corresponding to a beam size of 13.5 to 3.5 millimeters with L=1 meter.

The laser output beam may be obtained from a birefringent element and a polarizer installed within the cavity or by use of a partially reflective end mirror. The apparatus is operable with reasonable beam quality in either a long pulse mode or a Q-switched short pulse mode. Outputs on the order of 1 joule per pulse have been obtained in the long pulse mode and over 0.65 joules using Nd:YAG and over 1 joule using Nd:glass in a Q-switched mode.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

FIGS. 1A and 1B illustrate a stable/unstable resonator containing a face pumped slab laser in a laser apparatus in accordance with a first embodiment of the invention. The first embodiment operates in a Q-switched mode by means of a Pockel cell. FIG. 1A is a side elevation of the principal components and FIG. 1B is a perspective view of the principal components.

FIG. 1C illustrates a quarter wave plate of a second embodiment of the invention in which a quarter wave plate is substituted for the Pockel's cell of FIGS. 1A and 1B to achieve long pulse mode operation of the laser apparatus.

DESCRIPTION OF THE PREFERRED EMBODIMENTS

Figure 4:
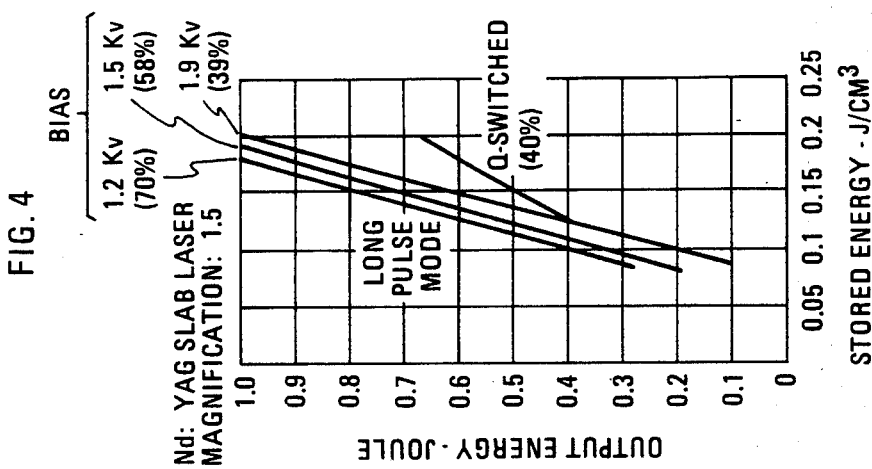
FIG. 4 is a graph of an output energy of the FIGS. 1A, 1B embodiment as a function of stored energy (Joules/cm$^3$) with differing settings of the Pockel's cell bias voltage, and providing a comparison between long pulse mode and the Q-switched mode of operation.

Referring now to FIGS. 1A and 1B, a laser apparatus in accordance with a first embodiment of the invention is shown comprising a stable/unstable optical resonator containing a gain medium in the form of a slab, the apparatus being operated in a Q-switched mode.

The laser apparatus, which may be operated either as an oscillator or as an amplitider, comprises a slab 10 of the gain medium of rectangular cross section, optical pumping means 11 arranged adjacent the larger lateral surfaces of the slab, which includes a first convex cylindrical mirror 12, defining one end of the optical cavity, and a second, concave spherical member 13 defining the other end of the optical cavity, and a Pockel's cell 14 and a polarizer 15 for Q-switching the optical resonator to effect operation in a Q-switched mode, the polarizer 15 also being the point at which the output beam of the laser apparatus is derived.

The optical elements of the laser apparatus are arranged along an optical axis (the Z axis) as illustrated in both FIGS. 1A and 1B. In a left to right sequence, the Pockel's cell 14 is second, the polarizer 15 is next, followed by the slab 10 and the convex cylindrical mirror 12 is last. These five elements are arranged at intervals which will be further defined below. An optional aperture 30, with vertical limits, may be provided between elements 13 and 14. The length of the cavity L, the radius $R_1$ of the convex cylindrical mirror 12 and the radius $R_2$ of the concave spherical mirror 13 define an optical resonator in which stable operation is achieved in a vertical dimension of the beam, the being being prevented from expanding in the P dimension beyond the aperture of the apparatus and unstable operation is achieved in a horizontal dimension, the beam being permitted to expand in the S dimension beyond the aperture of the apparatus.

The P and S axes in FIGS. 1A and 1B, which are established by the rotational orientation of the slab 10 about the Z axis define both the vertical and horizontal dimensions of the beam and thereby define the rotational orientations of the non-polarization sensitive members of the optical apparatus, but also define polarization components, which define the rotational orientations of the polarization sensitive members of the laser apparatus. The larger lateral faces of the slab 10 (the top and bottom faces in FIGS. 1A and 1B) define the SZ plane, the SZ plane being defined as the plane parallel to these faces which passes through the optical axis of the apparatus. The smaller lateral faces of the slab define the PZ plane; the PZ plane being defined as the plane parallel to these faces which passes through the optical axis of the apparatus. Accordingly, for convenience in discussing rays or a beam directed along the optical axis of the laser, P polarization may be regarded as being parallel to the PZ plane and S polarization may be regarded as being parallel to the SZ plane.

Returning now to a consideration of the operation of the laser apparatus of FIGS. 1A and 1B, it may be assumed that the optical pumping means 11 produces an "inversion" in the active medium of the laser slab in which there are larger populations of electrons in higher energy states than lower energy states. As a result of the pumping, radiation begins within the slab as a spontaneous emission from electronic transitions between an excited higher and a lower energy state. This radiation is of a precise wavelength and of a potentially coherent nature.

The rays, which exit via the end faces 16 and 17 of the slab parallel to the optical axis of the apparatus, are utilized in the optical cavity. The internal path of these rays through the slab is best seen in FIG. 1A. The slab, viewed from the side, is a parallelogram, with the end faces being established at the "Brewster angle" to the optical axis of the apparatus. The effect of a cut in this manner is to ensure that all light entering the left face of the slab 10 of P polarization will enter the slab without reflection loss. In addition, a substantial percentage (e.g. 20%) of light of S polarization will be reflected away and lost. The trace of a ray directed along the optical axis of the apparatus and assumed to enter the slab 10 at the mid-point of the left face 16 is illustrated in FIG. 1A. The entering ray is initially reflected downward toward the bottom surface of the slab (assuming the orientations of FIGS. 1A and 1B), is next reflected upward, then downward, then upward and so on sucessively until a final downward reflection occurs and the ray exits at the center of the slab's right face 17, again directed along the optical axis of the apparatus. ( A return ray proceeding from right to left would retrace the same path.)

In view of the polarization selective action of the end faces of the slab 10, the slab may be regarded as optically coupled to rays of P polarization traversing the optical resonator. As is well established, an optical cavity or resonator conventionally consists of two mirrors between which an active (lasing) slab is installed and which serves to allow light to pass recurrently through the active material to extract energy from the excited states. With careful execution, the rays produced in the slab form a coherent beam of light of a single wavelength.

In the FIG. 1 arrangement, rays which have exited the right face of the slab 10 proceed to the to the right along the optical axis of the apparatus toward the convex cylindrical mirror 12, which has a 100% reflective coating, and is reflected leftwards to the right face of the slab. The vertical polarization marks 21 denote that the rays in this path are of a P polarization (and the lack of a small circle superimposed on these marks denotes the exclusion of significant rays of an S polarization). The cylindrical mirror 12 is oriented in relation to the axes of the apparatus such that a trace of the mirror in a plane parallel to the PZ plane will be a straight line, while a trace of the mirror in a plane parallel to the SZ plane will be a circle having a radius $R_1$. The rays reflected leftward from the mirror 12 remain of a P polarization (21) and now enter the slab 10 at its right face. The rays exit at the left face of the slab, having retraced the internal path illustrated in 1A and remain of a P polarization as indicated by the polarization marks 22. The rays continue leftward until they impinge on the dielectric polarizer 15. The polarizer 15 is a flat plate, which transmits (e.g. 99%) light polarized parallel to the plane of incidence (a plane defined by the incident ray and the projection of that ray upon the face of the polarizer) and reflects (e.g. 99%) light polarized perpendicular to the plane of incidence. The polarizer is rotationally aligned upon the optical axis of the apparatus such that its plane of incidence is parallel to the PZ plane of the optical apparatus. Thus, rays of substantially pure P polarization 22, which enter the polarizer from the right, continue through the polarizer 15 to the left, with the vertical marks 23 denoting P polarization, which continues for the leftward rays until the Pockel's cell 14 is encountered.

The Pockel's cell 14 is centered on the optical axis of the apparatus in a prescribed rotational relationship with the PZ, SZ planes, which will hereinafter be referred to as the "P" and "S" planes, respectively. The Pockel's cell forms an electronically controlled optical "shutter" in the laser apparatus, turning it on or off by use of an electro-optical effect in its crystalline constituent subject to voltage control. In the state illustrated in FIGS. 1A and 1B, the Pockel's cell is electrically energized, and has produced a net 90° rotation of the polarization of the rays (23) (whose polarization is indicated by vertical lines) proceeding leftward toward the Pockel's cell in relation to rays (25) (whose polarization is indicated by circles) formed after a reflection from mrror 13, and exiting the Pockel's cell to the right, and proceeding toward the polarizer 15. When the Pockel's cell is in this active state, essentially all (e.g. 99%) of the light impinging on the polarizer 15 is ejected from the resonator as shown at 26. The ejection of the light reduces the optical "Q" of the resonant cavity, and produces "Q-switching" to an off state.

Q-switching operation depends upon the appearance of birefringence in the Pockel's cell under the influence of an external electric field, a property which disappears when the field is removed. A birefringent material exhibits two indices of refraction to light of orthogonal polarizations corresponding to a fast and a slow axis of propagation. In the preferred orientation, the planes defined by the electrooptic axes of the birefringent material and the normal passing through the center of the Pockel's cell are oriented at about 45° to the P plane of the laser apparatus. In other words, the fast (28) and slow (29) axes of the birefringent material are oriented at about 45° to the P polarization of the optical rays 23 incident from the right. Upon passage through the Pockel's cell, the two orthogonal components of the rays now travel along the same path but with the trace of the P polarization on the P plane being phase shifted 90° to the right along the Z axis, ahead of the trace of the P polarization on the S plane. The combination of the two mutually phase shifted components results in a substantially circularly polarized beam. The circularly polarized rays continue leftward in the same circular polarization until they impinge on the concave spherical mirror 13. The mirror 13 is centered on the optical axis of the apparatus and aligned orthogonal thereto. The spherical mirror 13 reflects the rays incident thereon without disturbance of the circular polarization (24). The circular polarization continues as the reflected wave proceeds to the right, returning to the Pockel's cell 14. Upon entering the Pockel's cell for a second time, the rays encounter further birefringent action. The component of the polarized rays projected on the P plane again passes through the cell phase shifted 90° ahead of the component of the polarized rays projected on the S plane. The phase shift is now doubled to 180°, and the resultant vector, based on recombining the two component vectors, has now rotated 90° to the horizontal P plane, as indicated by the polarization circles 25. These rays (25) resulting from Pockel's cell operation, now impinge on the dielectric polarizer 15, which ejects substantially all of the light (26) of S polarization to the output optics, preventing laser operation.

The laser apparatus, assuming that the Pockel's cell is not energized, lases—but without producing an output. Assuming that the applied voltage is reduced to zero, the Pockel's cell reverts to an inactive state in which light of P polarization (23) entering the Pockel cell from the right, exits the Pockel's cell at the left remaining of a P polarization. The light is next reflected from the mirror 13 (still remaining of a P polarization) back into the cavity, re-entering the Pockel's cell from the left, exiting from the right, and continuing in a P polarization (23), until it impinges on the left race of the polarizer 15. The polarizer 15 transmits all (99%) of the rightward proceeding rays into the slab 10 and lasing continues as if the Pockel's cell were not present. In this setting of the Pockel's cell, substantially no light is of the appropriate S polarization to be ejected to the output. In this state, the laser, while operated at maximum power, produces negligible output.

Normal laser output occurs when an intermediate voltage to that producing a 90° phase rotation for double transit and zero is applied to the Pockel's cell. This produces an output polarization establishing a specific percentage of feedback within the cavity and a specific percentage of light ejected to the output. A typical Pockel's cell setting occurs with 40% of the radiation incident on the polarizer 15 being ejected to the output and 60% transmitted to the next element within the resonator. This occurs with approximately a 45° phase shift per transit (a 90° phase shift per double transit) through the Pockel's cell, producing an approximately circular polarization at the input to the polarizer.

In customary Q-switched operation, the pumping means 11 is a flash lamp that is flashed several times (e.g. 10) per second; each flash producing light peaking after about 70 microseconds and having an overall duration of about 100 microseconds. The stored energy in the slab peaks about 120 microseconds after ignition of the flash lamp. The Q-switch is maintained in an off state until the pumping has achieved maximum energy storage in the slab, and then the Q-switch is operated to allow lasing. Approximately 50 nanoseconds after the operation of the Q-switch, a laser pulse of 20 to 30 nanoseconds occurs. The Q-switch remains on until the intensity of the laser beam has fallen to a small percentage of the maximum intensity and then operates to prevent further lasing. The Q-switch timing is set to prevent the formation of two laser pulses rather than one, in order to concentrate the laser output into a single output pulse.

An optional item in the apparatus of FIGS. 1A and 1B is the aperture 30 illustrated in position between the Pockel's cell 14 and the concave spherical mirror 13 where it intercepts the collimated beam, collimated by the mirror 13 before being returned via the slab to the other mirror or ejected to the output. As illustrated, the aperture 30 is centered on the axis of the optical system, and rotationally oriented such that its upper and lower boundaries are parallel to the S plane and bound the small stable axis of the optical beam. The aperture normally has no limits parallel to the P plane which might affect the unstable large axis of the optical beam. The vertical opening is set to insure optimum beam quality measured in the P plane and has a size which establishes the vertical dimension of the collimated beam as it passes to the output or back through the slab. Typically, this dimension is 3.5 mm corresponding to approximately half the vertical dimension of the slab. The aperture reduces any higher order modes which may be present in the P plane and establishes an essentially Gaussian TEM$_{oo}$ beam in that plane. The elimination of the higher order modes tends to improve the quality of the wavefront of the output beam in a composite manner affecting both phase and amplitude. The introduction of a lateral aperture (which is not herein suggested) along the unstable axis of the resonator would have the adverse affect of introducing additional fringes (i.e. the Fresnel diffraction effect) into the output beam and lowering the quality of the output beam.

In a practical example of the invention so far described, the slab is a Nd:YAG slab laser having a length of 139.37 mm, a width of ~15.0 mm, and a thickness of ~8.0 mm with the ends cut at the Brewster angle. The slab is placed within an optical cavity having a length (L) of 1 meter. The concave spherical mirror 13 has a radius of curvature (R$_1$) of 6 meters and the convex cylindrical mirror 12 has a radius of curvature (R$_{2p}$) of 4 meters.

The optical resonator cavity gives definition to the laser beam originating from spontaneous emission within the laser slab. As earlier stated, the optical cavity is vertically stable, implying that the beam is prevented from expanding vertically (P dimension) beyond the aperture of the apparatus, and horizontally unstable, implying that the beam is permitted to expand horizontally (S dimension), and elements beyond the aperture of the apparatus are lost.

Beam formation may be visualized in the following manner (assuming confocal operation). The beam elements which precede from the slab toward the concave mirror, even if diverging, are reflected backward toward the slab in a substantially collimated condition. The collimated beam, upon passing backward through the slab (and further intensified) impinges on the cylindrical mirror where the vertical dimension of the beam is held constant while the horizontal dimension of the beam expands. Thus, the vertically collimated, horizontally expanding beam returns from the cylindrical mirror via the slab (and further intensification) and impinges again on the spherical mirror 13. The beam is again recollimated in the spherical mirror and returned via the slab to the cylindrical mirror for further horizontal expansion. The process gradually causes the lateral limits of the beam to expand past the natural apertures of the optical system and to be lost. The vertical limits of the beam, however, remain at a substantially constant size.

The stable axis of the optical resonator falls in the P plane. This implies that rays forming beam elements on the vertical axis and lying in the P plane do not walk out of the aperture of the apparatus. The stability of the resonator is defined for the stable (P) axis by the quantity G$_p$, where for stability G$_p \leq 1$. To beam elements lying on the stable axis in the P plane, the resonator consists of a flat mirror 12 having a radius R$_{2p}$=6 meters, which indicates that the stability factor, G$_p \leq 1$, G$_p$ being defined as:

$$G_p = (1 - L/R_{1p})(1 - L/R_{2p})$$

where
R$_{1p}$ = ∞ (being flat in the P plane)
R$_{2p}$ = 6 meters, and
L = 1 meter.
Substituting:

$$G_p = (1)(1 - 1/6) = 0.833$$

and is stable.

The unstable axis of the optical resonator falls in the S plane. This implies that rays forming beam elements on the horizontal axis and lying in the S plane do walk out of the aperture of the apparatus. The effect of beam walkout is to cause some loss, but also to improve the quality of the beam.

The stability of the resonator is defined for the unstable (S) axis by the quantity G$_s$, where the stability G$_s > 1$. To beam elements lying on the unstable axis in the S plane, the resonator consists of a curved convex mirror having a radius R$_{1s}$=4 meters, a curved concave mirror 13 having a radius R$_{2s}$=6 meters, a curved concave mirror 13 having a radius R$_{2s}$=6 meters, which indicates that the stability factor Gs > 1. G$_s$ being defined as $$G_s = (1 - L/R_{1s})(1 - L/R_{2s})$$
$$= (1 + \tfrac{1}{3})(1 - 1/6)$$
$$= \frac{5}{4} \cdot \frac{5}{6} = \frac{25}{24} = 1.042$$

As noted above, the resonator is confocal in the unstable axis. In particular:

$$F_{1s} + F_{2s} = L$$

with the quantities F$_{1s}$=3 m, F$_{2s}$=−2 m, and L=1 m, and the common focus is placed outside the cavity. One advantage of the confocal arrangement is that rays ejected to the output as by the polarizer 15 from the concave spherical mirror are substantially collimated and do not require additional refocusing.

The magnification (M) of the optical cavity is the ratio of the radii of curvature of the concave mirror to the convex mirror:

$$M = R_2/R_1 = 6\ m/4\ m = 1.5$$

where m is in meters.

The measure of the aperture size of the optical cavity is the "Fresnel" number, which is equal to the number of Fresnel fringes across the usable aperture at the lasing wavelength. The beam size of 13.5×3.5 mm corresponds to Fresnel numbers of $$N_{fl} = a_1 2/\lambda L$$

= 2.88 measured in the stable vertical axis

= 42.82 measured in the unstable horizontal axis, where
a$_1$ is half the aperture size and
λ is the wavelength of the radiation.

The beam produced by the apparatus of FIGS. 1A and 1B is of rectangular cross section and visually reassembles a horizontally magnified TEM$_{oo}$ mode. The output beam is of high energy containing over 0.65 joule for Q-switched operation. The estimated total volume of the slab swept by the beam, based on a beam size within the cavity of 13.5×3.5 millimeters, is about 6 cubic centimeters. The unit has a Q-switched extraction efficiency of over 50%, in contrast to a more typical value of 30% to 40%.

Figure 3:
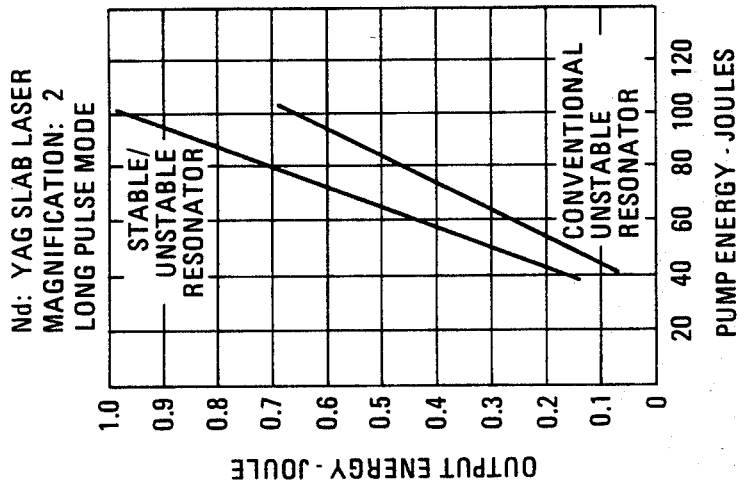
FIG. 3 is a graph of the output energy in joules as a function of pump energy in joules of the stable/unstable resonator in comparison to that of a conventional unstable resonator.

The increase in efficiency of the use of stored energy by virtue of the stable/unstable design is evident from FIG. 3. In FIG. 3, the results were experimentally obtained; the resonator was an unstable confocal arrangement with a magnification of 2 with a concave spherical mirror having a 4 meter radius and a convex spherical mirror having a 2 meter radius. The stable/unstable resonator employed a 2 meter radius convex cylindrical mirror, instead of the 2 meter radius convex spherical mirror. The resonator cavity length was 1 meter and apertures were set to establish a beam size of 13.5×4 mm. FIG. 3 illustrates that, assuming long pulse mode operation and pumping plotted through a range of 40–100 joules, a conventional unstable resonator will produce an output energy of from 0.08 to 0.65 joules. Under similar conditions, the stable/unstable resonator will produce output energy of from 0.15 to 0.95 joules, which is significantly better. The efficiency of output energy utilization may ordinarily be somewhat further increased as the magnification falls. Since this produces some loss in beam divergence, the improvement in output energy in reducing the magnification to 1.5 or lower numbers must be reconciled with these other factors.

The output energy in joules of the FIGS. 1A, 1B embodiment as a function of stored energy in joules per cubic centimer is provided in FIG. 4. The magnification, as earlier noted, is 1.5 and the device is operated in both the long pulse mode and the Q-switched mode. In the long pulse mode the separate Pockel's cell bias voltages were employed to provide output reflectivities corresponding to 39%, 58% and 70%. The latter reading producing the highest energy output. In the Q-switched mode, a setting corresponding to 40% reflectivity was employed and at the upper limit of operation, 0.2 of a joule per cc of stored energy was achieved in a laser slab from 60 joules of pumping energy. As earlier noted, the output energy was about 0.67 joules.

The design of the stable/unstable resonator produces a larger output than comparable designs using a rectangular slab while maintaining good beam quality. It has been possible to generate a single transverse beam whose dimension in one axis is comparable to the thickness of the slab. This is in part a property of the slab geometry in which the rays propagating down the slab are recurrently reflected between the major lateral surfaces. In propagating the beam in successive reflections between upper and lower lateral surfaces of the slab, the thermal lensing effects are cancelled out. The optical design of the cavity, including the use of magnification (and unstable operation) along one axis of the resonator, also contributes to this larger output.

The use of magnification to expand the beam parallel to the major faces of the laser slab provides a substantial increase in cross-section of the beam, permits a significant increase in output power, but also produces potentially offsetting losses in efficiency and in beam quality. Accordingly, the magnification increase must represent a compromise, optimized for the particular application. In the two designs herein disclosed, magnifications of 1½ and 2 in the unstable axis have been employed.

Figure 2:
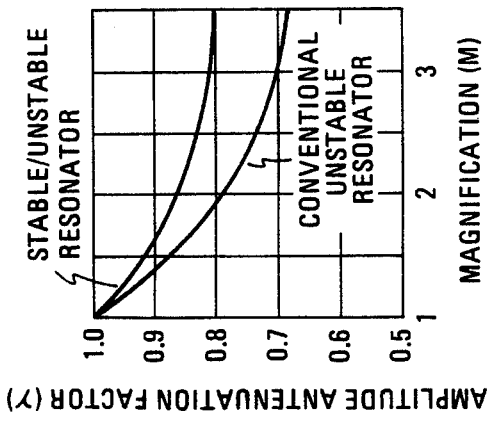
FIG. 2 is a graph of the amplitude attenuation factor ($\gamma$) of the principal mode as a function of magnification of the stable/unstable resonator of FIGS. 1A and 1B, in comparison to that of a conventional unstable resonator.

FIG. 2 indicates the calculated increase in the "amplitude attenuation factor" or eigenvalue ($\gamma$) associated with increasing magnification. The diffraction loss per pass through the cavity is $(1-|\gamma|^2)$, so that a "$\gamma$" near 1 represents a low loss condition and a $\gamma$ near "0" represents a very high diffraction loss. FIG. 2 illustrates a comparison between a stable/unstable resonator and a conventional unstable resonator. The magnification is plotted over a range of 1 to 3½. (The amplitude attenuation factor of the dominant mode for a 4 millimeter wide stable resonator is almost 1 and would be substantially independent of magnification.) The amplitude attenuation factor for the dominant mode for a 4 millimeter wide unstable resonator is shown to decrease rapidly as the magnification increases. Assuming a magnification of 2, for instance, a conventional unstable resonator has an amplitude attenuation factor of approximately 0.79. Assuming a magnification of 1.5, a conventional unstable resonator has a much better amplitude attenuation factor of 0.88. At the same time, a stable/unstable resonator has higher (and better) comparable values. For a magnification of 2, the attenuation factor is approximately 0.86 and for a magnification of 1.5 it is 0.92.

The stability factor is defined by the variable "G", whose independent variables are the mirror positions and their curvatures. In the example where the magnification is 1½, "G" has a value of 1.25 indicating instability, since it is in excess of 1. The implication arising from the stability factor is that individual rays of the beam in multiple reflections will be reflected beyond the boundaries of the optical system and be lost.

The F-K diffraction theory describes the optical cavity and provides guidance to the initial optical design along either the stable or unstable axis. The cavity may be regarded as sustaining a plurality of simultaneous modes. These modes, which are known as eigenfunctions, are well known both in visual appearance and as to phase and amplitude. These modes are characterized by three letter designations (Transverse ElectroMagnetic wave) with mode order subscripts (e.g. $TEM_{00}$, $TEM_{01}$, $TEM_{10}$, etc.). Two independent parameters of the eigenfunction are the Fresnel number and the G number earlier discussed. The relationship of these modes to one another in the composite beam is by the eigenvalue ($\gamma$), a complex quantity denoted the amplitude reduction factor (as noted earlier), which indicates both the amplitude and the phase of a given mode as a function of the parameters of the optical resonator.

In a conventional beam, where the $TE_{00}$ mode is desired, some degree of contribution may be expected from secondary modes. The individual modes have differing amplitudes and phases and thus where contribution to the beam from differing modes occurs, both phase and amplitude control of the individual modes must take place in the interests of beam quality. Ideally, the eigenvalue which appears as $\gamma$ in the power loss expression $1-[\gamma]^2$ should be near unity for the principal mode and near zero for undesired higher order modes. The classical statement of the beam formed in the stable optical cavity is thus a contribution of a plurality of products: $\gamma_n U_n$, where $\gamma$ is the eigenvalue, U is the eigenfunction and n the subscript denoting the mode order in question.

In a well designed laser apparatus, the composite beam is required to have a substantially constant amplitude and substantially constant phase front. Along the stable axis of the classical resonator, the magnitude of the eigenvalue is reduced as its phase changes as the order of eigenmodes increases, forming a spiral locus in a complex plane, migrating to the center thereof. The rate of decrease in magnitude of the eigenvalue increases as the Fresnel number decreases. Thus, the mode selectivity increases. For large Fresnel numbers, the eigenvalues migrate toward a unity circle in the complex plane reducing mode selectivity. Thus, the designer, while desiring to employ larger Fresnel numbers for higher efficiency and higher power, is usually held to smaller Fresnel numbers and the use of strategic aperturing to suppress undesired higher order modes. In the present embodiments, the designer has been able to employ Fresnel numbers as high as 4 along the stable axis, without significant deterioration of the beam quality.

In relation to the unstable mode, both the concept of an eigenmode and eigenvalue γ are imperfect. The mode description is not exact since after a finite number (on the order of 10 for Q-switched operation) of reflections, a significant number of rays will be reflected out of the system and lost. The quantity "γ" thus represents a mixture of diffraction losses and beam "walkout". The mode structure is susceptible of numerical integration, however, and indicates that there is not an orderly pattern of dependency of the eigenvalues upon the Fresnel numbers. Thus, while one might expect larger Fresnel numbers to be unsatisfactory in mode suppression, Fresnel numbers as large as 43 have been achieved with careful use of magnification as earlier discussed.

The present stable/unstable resonator may be operated to produce a good quality beam in either the Q-switched short pulse mode illustrated in FIGS. 1A and 1B or in a long pulse mode. In Q-switched operation, a stable resonator may in fact depend on the time required to establish a mode to advantage to suppress undesired higher order modes. In the present stable/unstable resonator, improvements in power with reasonable beam quality have been practical in the Q-switched, short pulse mode. In the long pulse mode, this improvement is particularly great due to the off axis beam walkout of the design.

The invention has been used with Nd:YAG, as well as Nd glass slab laser materials. The design contemplates operation with both high gain and moderate gain laser materials, the typical high gain materials permitting magnifications from above 1 to about three before losses become excessive. Lower gain materials would require lower magnifications.

FIG. 1C illustrates a convenient variation of the first embodiment in which a quarter-wave plate 31 may be substituted for the Pockel's cell 14 of FIGS. 1A and 1B to achieve long pulse operation of the laser apparatus. The quarter-wave plate 31 is rotated to a desired angle in relation to the P, S coordinate axes to reflect a desired amount of the beam (reflected from the concave spherical mirror 13) to the output and to transmit a desired amount of the beam back to the slab for recirculation within the cavity.

In the arrangements so far described, the output beam is derived by a dielectric polarizer in association with a Pockel's cell or a quarter-wave plate installed within the optical cavity. The quarter-wave plate intercepts the beam within the cavity and causes a portion of it to be ejected out of the cavity to form an output beam and a portion of it to be transmitted on to the next element within the cavity for recirculation within the cavity. If the dielectric polarizer derives its beam from reflection from the concave spherical mirror (13), a collimated beam is derived which simplifies the output optics. One can, of course, derive the beam from the spherical mirror if cylindrical correction is introduced or one may employ a less than 100% reflective surface for the end mirrors and derive the output beam from transmission through one of the mirrors 12, 13. In this last case, the percentage of reflection and the percentage of transmission of the end mirror determines the amount of optical energy which remains in the cavity and the amount which is ejected to form the output beam.

In the arrangements so far described, the primary coordinates of the optical system are defined in relation to the slab 10. Ordinarily, the beam which enters the slab at its center point of one end face and which exits the other end of the slab at its center point defines the optical axis of the laser apparatus. Ordinarily, an extension of the incident ray will be in approximate coincidence with the emergent ray and thus to a first approximation the optical axis of the system is a straight line. The axis of the optical system need not be a straight line, but may be bent or folded, so long as orientations orthogonal to the optical axis are maintained. The use of a slab having Brewster angle ends, for polarization selection, thus defines the P or S polarization, which is used to apportion energy between the output beam of the cavity and the beam recirculated within the cavity. The lateral surfaces of the slab are assumed for purposes of this discussion to be flat with the major lateral surfaces parallel, the minor lateral surfaces parallel, and the major lateral surfaces lying in planes oriented 90° with respect to the minor lateral surfaces. These lateral surfaces, as earlier noted, define the P and the S planes. Since the actual polarization settings are relatively approximate, some imprecision in these requirements may be tolerated without significant impairment of the function of the laser apparatus.

The use of a Brewster angle at the ends of the slab laser permits a highly efficient entrance of the beam into the slab with very little beam loss and facilitates polarization of the resulting laser beam. The Brewster angle construction permits the slab to operate at higher output power levels and provides a beam polarizer useful in Q-switched operation in which the polarizer itself has a high power capability.

What is claimed is:
1. A laser apparatus comprising:
  A. a slab of a gain medium for producing a beam of coherent electromagnetic radiation passing via the end faces of said slab, a ray entrant at the mid-point of one said end face and exiting at the mid-point of the other said end face defining the optical axis of said apparatus, said slab having a rectangular cross-section in which the plane parallel to the larger lateral face of the slab, passing through said optical axis, defines an "S" plane, and a plane parallel to the smaller lateral face of the slab, and passing through said optical axis, defines a "P" plane;
  B. optical pumping means coupled to the larger lateral surfaces of said slab to energize said beam;
  C. a resonant optical cavity containing said slab and aligned upon said optical axis for sustaining multiple passes of the rays of said beam via said slab within said cavity, comprising:
    (1) a first convex cylindrical mirror optically aligned upon said axis having a finite radius of curvature ($R_1$) in said "S" plane,
    (2) a second concave spherical mirror, optically aligned upon said axis at a distance L from said first mirror, said second mirror having a radius of curvature $R_2$, where $R_2$ may include infinity;
  said variables $R_1$, $R_2$ and L being selected to effect stable resonator beam formation in the dimension of said beam lying in said "P" plane, and unstable resonator beam formation in the dimension of said beam lying in said "S" plane, to provide sufficient gain for lasing and an increased effective active energy extraction volume in said slab for maximum energy extraction.

2. The laser apparatus set forth in claim 1 wherein the stability criterion (G)

$$G = \left(1 - \frac{L}{R_1}\right)\left(1 - \frac{L}{R_2}\right)$$

is $\leq 1$ to beam elements lying in the P plane for stable resonator beam formation and is $>1$ to beam elements lying in the S plane for unstable resonator beam formation.

3. The laser apparatus set forth in claim 2 wherein the radius of said first, convex mirror ($R_1$)

$$R_1 = -2L/(M-1),$$

the radius of said second, concave mirror ($R_2$) equals $$R_2 = 2LM/(M-1),$$

the combination producing a magnification $$M = R_2/R_1,$$

the quantity M having a value $>1$ to beam elements lying in said P plane, and is selected to optimize output power and the quality of the output beam.

4. The laser apparatus set forth in claim 3 wherein:
said first and second mirrors are confocally arranged at a distance (L):

$$L = F_2 + (-F_1)$$

where
$F_1$ is the focal length of said first mirror, and
$F_2$ is the focal length of said second mirror measured in said S plane, so that beam elements lying in said S plane reflected from said second mirror to said first mirror are collimated.

5. The laser apparatus set forth in claim 4 wherein the quantity M lies within the range from greater than 1 to about 3 to beam elements lying in said S plane for typical high gain laser slab materials.

6. The laser apparatus set forth in claim 4 wherein an aperture is provided aligned upon said optical axis between said second mirror and said slab, the edges being oriented in planes parallel to said S plane, and
said aperture being adjusted to improve the beam quality to beam elements lying in said P plane.

7. The laser apparatus set forth in claim 6 wherein
said aperture provides a Fresnel number of greater than 1 and less than 4 to beam elements lying in said P plane, and
said apparatus provides a Fresnel number in excess of 10 to beam elements lying in said S plane.

8. The laser apparatus set forth in claim 7 wherein
the end faces of said slab are inclined at the Brewster angle to the larger lateral faces of the slab.

9. The laser apparatus as set forth in claim 2 wherein
one of said end mirrors has a partial reflectance to permit derivation of an output beam therefrom.

10. The laser apparatus set forth in claim 2 wherein
a birefringent member and a polarizer are aligned upon said optical axis between one of said mirrors and said slab,
said polarizer being disposed between said birefringent member and said slab to ray components of S plane polarization to form an output beam and to transmit ray components of P plane polarization to said slab,
said birefringent member adjusting the ratio of ejected light to transmitted light to optimize the power output.

11. The apparatus set forth in claim 10 wherein
said birefringent member is a quarter wave plate, whose rotational orientation is adjusted to optimize said power output.

12. The laser apparatus set forth in claim 9 wherein
said birefringent member is a Pockel's cell, arranged for Q-switched, short pulse operation.

13. The laser apparatus set forth in claim 12 wherein
said Pockel's cell is adjustable between a first state providing a 90° polarization rotation for a double beam passage to prevent oscillation of the laser, and a second state providing a second polarization rotation $2\theta$ for a double beam passage of less than 90° polarization rotation,
said polarization angle $2\theta$ being selected to permit a desired ratio of ejected to transmitted light.

* * * * *